United States Patent
Lee et al.

(10) Patent No.: US 7,570,199 B2
(45) Date of Patent: Aug. 4, 2009

(54) DEVICE AND METHOD FOR DETECTING OVERLAP OF PULSE SIGNALS AND APPARATUS FOR ESTIMATING DISTANCE USING THE SAME

(75) Inventors: Sang Yub Lee, Gyunggi-Do (KR); Chang Soo Yang, Gyunggi-Do (KR); Min Kyoung Kwon, Seoul (KR); Seung Heon Han, Seoul (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 138 days.

(21) Appl. No.: 11/925,204

(22) Filed: Oct. 26, 2007

(65) Prior Publication Data

US 2008/0106461 A1 May 8, 2008

(30) Foreign Application Priority Data

Nov. 6, 2006 (KR) ...................... 10-2006-0108876

(51) Int. Cl.
*G01S 13/75* (2006.01)
(52) U.S. Cl. .................... 342/125; 342/118; 342/134
(58) Field of Classification Search ................ 342/125
See application file for complete search history.

(56) References Cited

U.S. PATENT DOCUMENTS

| | | | | |
|---|---|---|---|---|
| 4,132,991 A | * | 1/1979 | Wocher et al. .............. 342/134 |
| 5,453,748 A | * | 9/1995 | Lindell .......................... 342/51 |
| 5,726,742 A | * | 3/1998 | Nourrcier .................. 356/5.01 |
| 7,439,904 B2 | * | 10/2008 | Kim et al. .................... 342/118 |
| 7,518,546 B2 | * | 4/2009 | Kim et al. .................... 342/118 |
| 2004/0135719 A1 | * | 7/2004 | Richards et al. ............. 342/125 |
| 2006/0136016 A1 | * | 6/2006 | Kim et al. ...................... 607/60 |
| 2008/0068255 A1 | | 3/2008 | Yang et al. |

* cited by examiner

*Primary Examiner*—Thomas H Tarcza
*Assistant Examiner*—Matthew M Barker
(74) *Attorney, Agent, or Firm*—Lowe Hauptman Ham & Berner

(57) ABSTRACT

There is provided a device and method for detecting an overlap of pulse signals, capable of easily detecting a point where reference and delayed pulse signals overlap each other, and an apparatus for estimating a distance using the same. The device for detecting an overlap of pulse signals, the device detecting a point where first and second pulse signals having different frequencies begin to overlap each other, the device including: a duty adjustor generating a third pulse signal by increasing a duty of the second pulse signal; a pulse signal calculator multiplying the first and second pulse signals by the third pulse signal, respectively and adding respective results together to output a signal; and an overlap determiner determining a middle of a pulse with a greatest width in the signal outputted from the pulse signal calculator as a point where the first and second pulse signals overlap each other.

11 Claims, 5 Drawing Sheets

DEVICE AND METHOD FOR DETECTING OVERLAP OF PULSE SIGNALS AND APPARATUS FOR ESTIMATING DISTANCE USING THE SAME

CROSS-REFERENCE TO RELATED APPLICATIONS

This application claims the priority of Korean Patent Application No. 2006-108876 filed on Nov. 6, 2006, in the Korean Intellectual Property Office, the disclosure of which is incorporated herein by reference.

BACKGROUND OF THE INVENTION

1. Field of the Invention

The present invention relates to a device and method for detecting an overlap of pulse signals and an apparatus for estimating a distance using the same, and more particularly, to a device and method for detecting an overlap of pulse signals, capable of easily detecting a point where a reference pulse signal and a delayed pulse signal overlap each other in an apparatus for estimating a distance which estimates a distance between distance estimating devices by counting pulses of the reference pulse signal generated at a point of transmitting a distance estimation signal and the delayed pulse signal generated at a point of receiving a response signal for the distance estimation signal, and the apparatus for estimating a distance using the same.

2. Description of the Related Art

In general, with a location awareness technology, wireless communication devices communicate wirelessly with each other using a wireless signal to estimate a current location thereof. Information obtained by the location awareness technology is significantly utilized to implement a more effective network.

To enhance accuracy of location awareness in this technology, it is of great importance to accurately detect a distance between two wireless communication devices. Typically, for distance estimation, the distance is calculated by detecting a time of arrival (TOA), i.e., time required for two wireless communication devices to transmit and receive a signal wirelessly. Also, the TOA is detected by counting certain pulses of pulse signals by a counter and utilizing this count value and frequencies of the pulse signals. The method for estimating a distance by counting pulses is disclosed in Korean Patent Application No. 10-2006-0090309, entitled "Apparatus and method for estimating distance using time of arrival", which was filed on Sep. 18, 2006 by the same applicant.

In the method for estimating a distance between devices disclosed in the above document, a point where two pulse signals overlap each other is determined and then a distance between the devices is estimated based on the count value obtained by counting pulses of the two pulse signals up to the point of overlapping and frequencies of the pulse signals. FIG. 1 illustrates a conventional technology for detecting an overlap of two pulse signals used in the distance estimation method disclosed in the prior art document.

As shown in FIG. 1, to identify a portion where a first pulse signal P1 and a second pulse signal P2 having different frequencies overlap each other, the two pulse signals P1 and P2 are multiplied by each other, and when a pulse signal M1 is generated subsequently, it is determined that an overlap has occurred. That is, conventionally, the two pulse signals are multiplied by each other, and only when the first pulse signal P1 has a high value and the second pulse P2 has a high value, it is determined that the pulse signals overlap each other. In consequence, in the conventional method, when the pulse signals are overlapped in a very small portion, such an overlap is hardly detected.

SUMMARY OF THE INVENTION

An aspect of the present invention provides a novel device for detecting an overlap of pulse signals, which generates a new pulse signal having a frequency identical to one of two pulse signals and a duty increased to detect an overlap between the two pulse signals, and multiplies the new pulse signal by the two pulse signals, respectively to detect the overlap of the pulse signals.

An aspect of the present invention also provides a novel method for detecting an overlap of pulse signals as described above.

An aspect of the present invention also provides an apparatus for estimating a distance using the device for detecting an overlap as described above.

According to another aspect of the present invention, there is provided a device for detecting an overlap of pulse signals, the device detecting a point where first and second pulse signals having different frequencies begin to overlap each other, the device including: a duty adjustor generating a third pulse signal by increasing a duty of the second pulse signal; a pulse signal calculator multiplying the first and second pulse signals by the third pulse signal, respectively and adding respective results together to output a signal; and an overlap determiner determining a middle of a pulse with a greatest width in the signal outputted from the pulse signal calculator as a point where the first and second pulse signals overlap each other.

The third pulse signal may have a leading edge at a point identical to the second pulse signal.

The third pulse signal may have a pulse width identical to a sum of a pulse width of the first pulse signal and a pulse width of the second pulse signal.

The pulse signal calculator may include: a first multiplier multiplying the first pulse signal by the third pulse signal; a second multiplier multiplying the second pulse signal by the third pulse signal; and an adder adding and outputting outputs of the first and second multipliers.

According to another aspect of the present invention, there is provided a method for detecting an overlap of pulse signals, the method designed to detect a point where first and second pulse signals begin to overlap each other, the method including: generating a third pulse signal by increasing a duty of the second pulse signal; multiplying the first and second pulse signals by the third pulse signal, respectively and adding respective results together to output a signal; and determining a middle of a pulse with a greatest width in the signal outputted as a point where the first and second pulse signals begin to overlap each other.

According to still another aspect of the present invention, there is provided an apparatus for estimating a distance, the apparatus estimating a distance between first and second wireless communication devices which communicate wirelessly with each other, the apparatus including: a reference pulse signal generating part generating a reference pulse signal having a first frequency at a point where the first wireless communication device transmits a distance estimation signal to the second wireless communication device; a delayed pulse signal generating part generating a delayed pulse signal having a second frequency different from the first frequency at a point where the first wireless communication device receives a response signal transmitted from the second wireless communication device in response to the distance estimation signal; an overlap detection part including: a duty adjustor generating a duty adjusted pulse signal by increasing a duty of the delayed pulse signal; a pulse signal calculator multiplying the reference pulse signal and the delayed pulse signal by the duty adjusted pulse signal, respectively, and adding respective results together to output a signal; and an overlap determiner determining a middle of a pulse with a greatest width in the signal outputted from the pulse signal calculator as a point where the reference pulse signal and the delayed pulse signal begin to overlap each other; a counter part counting a pulse of one of the reference pulse signal and the delayed pulse signal up to the point where the reference pulse signal and the delayed pulse signal begin to overlap each other; and a distance calculation part calculating a time from a point of transmitting the distance estimation signal to a point of receiving the response signal based on the first frequency, the second frequency and a count value of the counter part, and calculating a distance between the first and second wireless communication devices based on the time.

The distance calculation part may calculate the time from the point of transmitting the distance estimation signal to the point of receiving the response signal according to Equation 1:

$$Tx = N \cdot \left| \frac{1}{f0} - \frac{1}{f1} \right| + \delta \qquad \text{Equation 1}$$

where Tx is the time from the point of transmitting the distance estimation signal to the point of receiving the response signal, N is the count value of one of the reference pulse signal and the delayed pulse signal, f0 is the frequency of the reference pulse signal, f1 is the frequency of the delayed pulse signal and δ is an arbitrary offset value.

The duty adjusted pulse signal may have a leading edge at a point identical to the delayed pulse signal.

The duty adjusted pulse signal may have a pulse width identical to a sum of a pulse width of the reference pulse signal and a pulse width of the delayed pulse signal.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
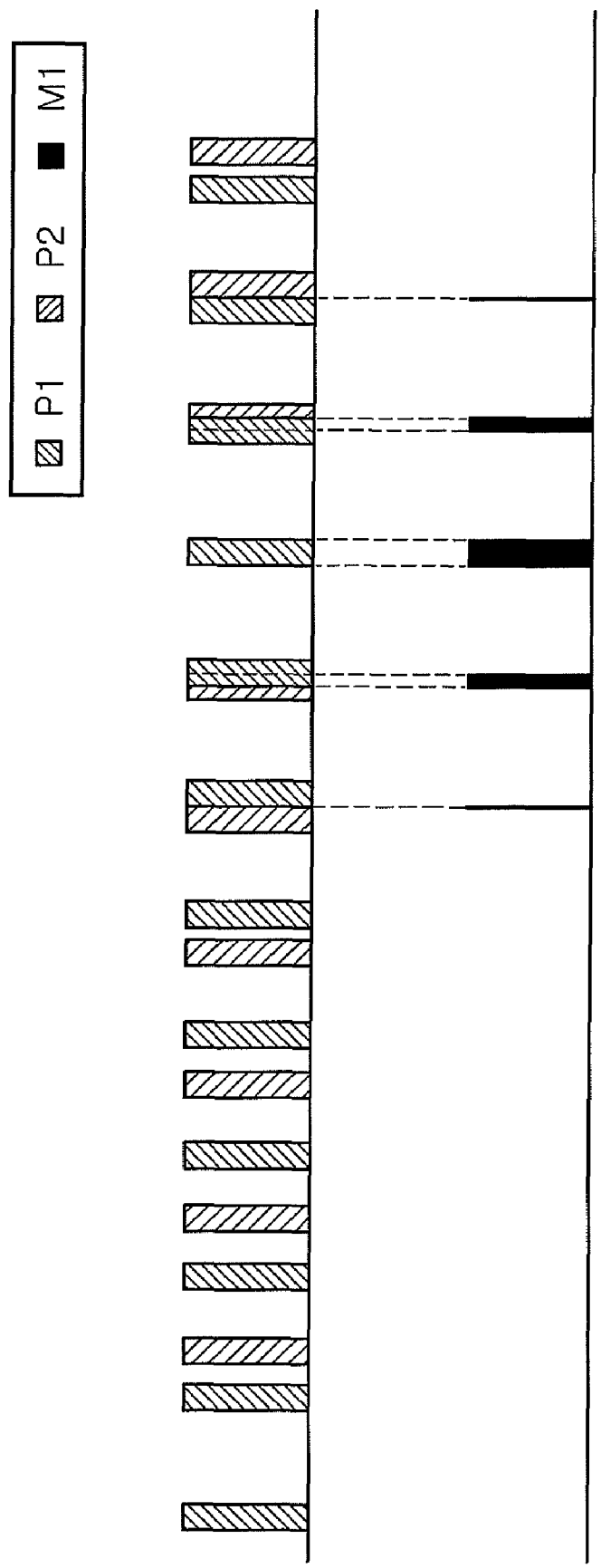
FIG. 1 is a waveform diagram for explaining a conventional method for detecting an overlap of pulse signals.

Exemplary embodiments of the present invention will now be described in detail with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference signs are used to designate the same or similar components throughout. Also, the terms employed in the invention are defined in view of functions of the invention, and thus may be changed depending on the intent or practice of a skilled person in the art. Therefore, the terms should not be construed to limit technical features of the invention. A pulse signal in the specification will be construed to refer to a pulse train having a plurality of pulses repeated periodically.

Figure 2:
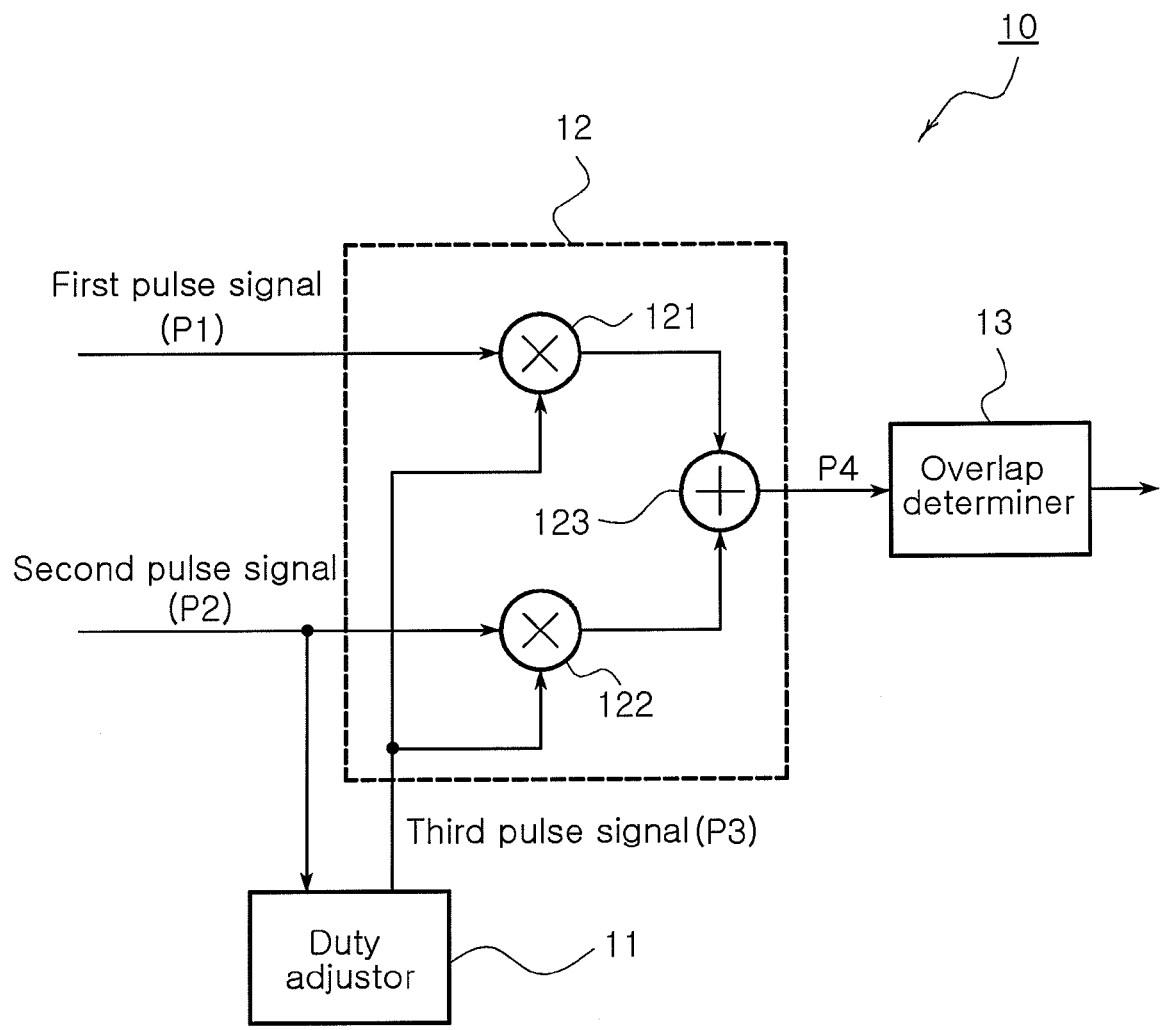
FIG. 2 is a block diagram illustrating a device for detecting an overlap of pulse signals according to an exemplary embodiment of the invention.

FIG. 2 is a block diagram illustrating a device for detecting an overlap of pulse signals according to an exemplary embodiment of the invention.

Referring to FIG. 2, the device 10 for detecting an overlap of pulse signals according to the present embodiment includes a duty adjuster 11, a pulse signal calculator 12 and an overlap determiner 13.

The present invention is designed to detect a point where a first pulse signal P1 and a second pulse signal P2 having different frequencies overlap each other.

The duty adjustor 11 receives one of the two pulse signals P1 and P2, e.g., the second pulse signal P2 in FIG. 2, and generates another pulse signal having a duty increased, e.g. a third pulse signal P3.

The pulse signal calculator 12 multiplies the first pulse signal P1 by the third pulse signal P3, and the second pulse signal P2 by the third pulse signal P3, and adds respective results together to output a signal. To this end, the pulse signal calculator 12 may include a first multiplier 121 multiplying the first pulse signal P1 by the third pulse signal P3, a second multiplier 122 multiplying the second pulse signal P2 by the third pulse signal P3, and an adder 123 adding and outputting outputs of the first and second multipliers 121 and 122. The first and second multipliers 121 and 122 may be configured as an AND logic device and the adder 123 may be configured as an OR logic device.

The overlap determiner 13 determines a middle of a pulse with a greatest width in the signal outputted from the pulse signal calculator 12 as a point where the first and second pulse signals P1 and P2 overlap each other.

Figure 3:
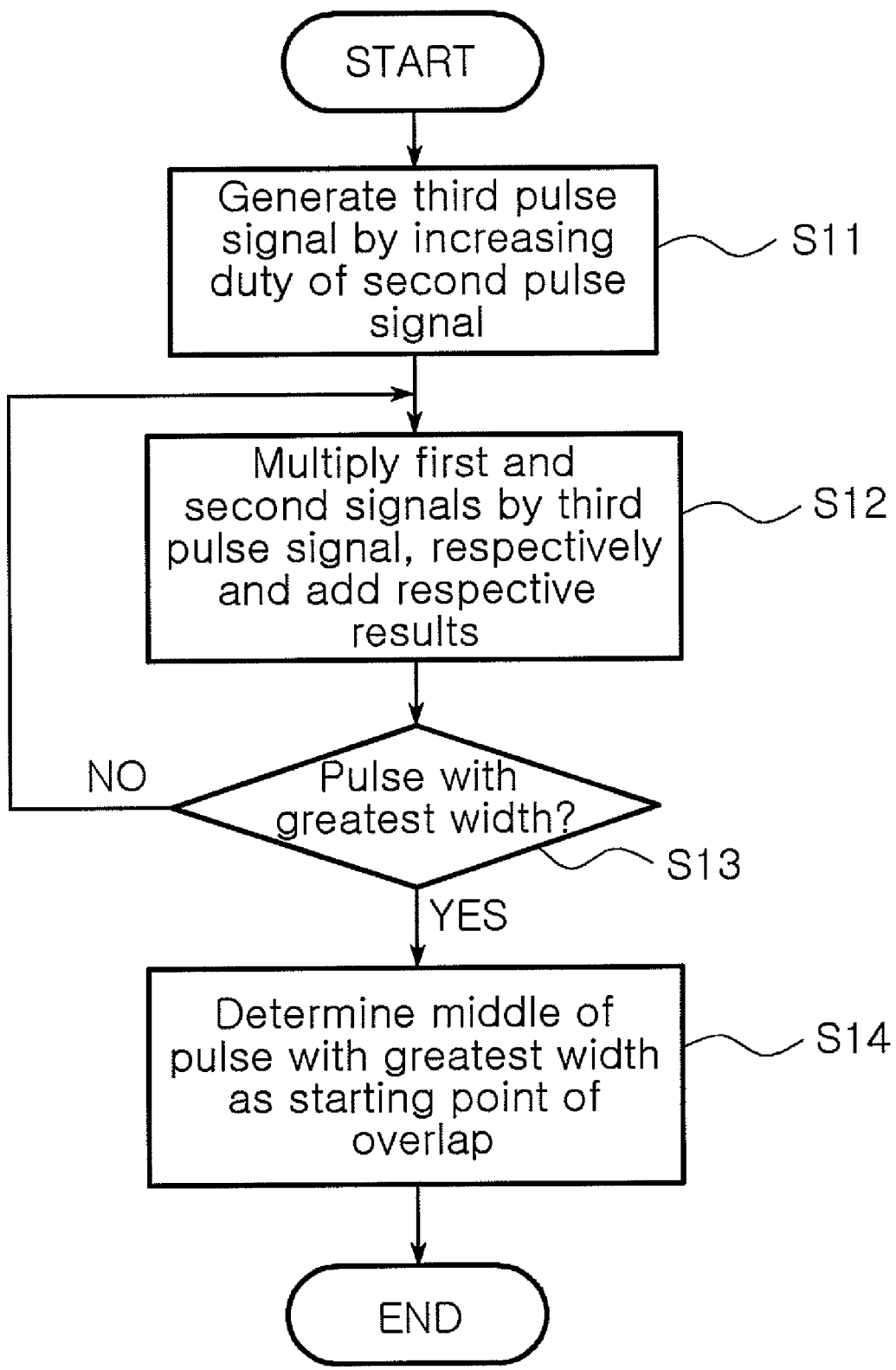
FIG. 3 is a flow chart illustrating an overlap of pulse signals according to an exemplary embodiment of the invention.

FIG. 3 is a flow chart illustrating a method for detecting an overlap of pulse signals according to an exemplary embodiment of the invention.

Referring to FIG. 3, in order to detect an overlap of pulse signals according to the present invention, a pulse signal is generated by increasing a duty of one of first and second pulse signals having different frequencies, e.g., second pulse signal, in operation S11. Subsequently, the first and second pulse signals are multiplied by the third pulse signal, respectively and respective results are added together to output a signal in operation S12. Then, a width of pulses is detected from the signal outputted in the adding operation to determine whether a corresponding one of the pulses has a greatest width in operation S13. Afterwards, a middle of a pulse with a greatest width in the signal outputted in the adding operation is determined as a point where the first and second pulse signals overlap each other in operation S14.

Figure 4:
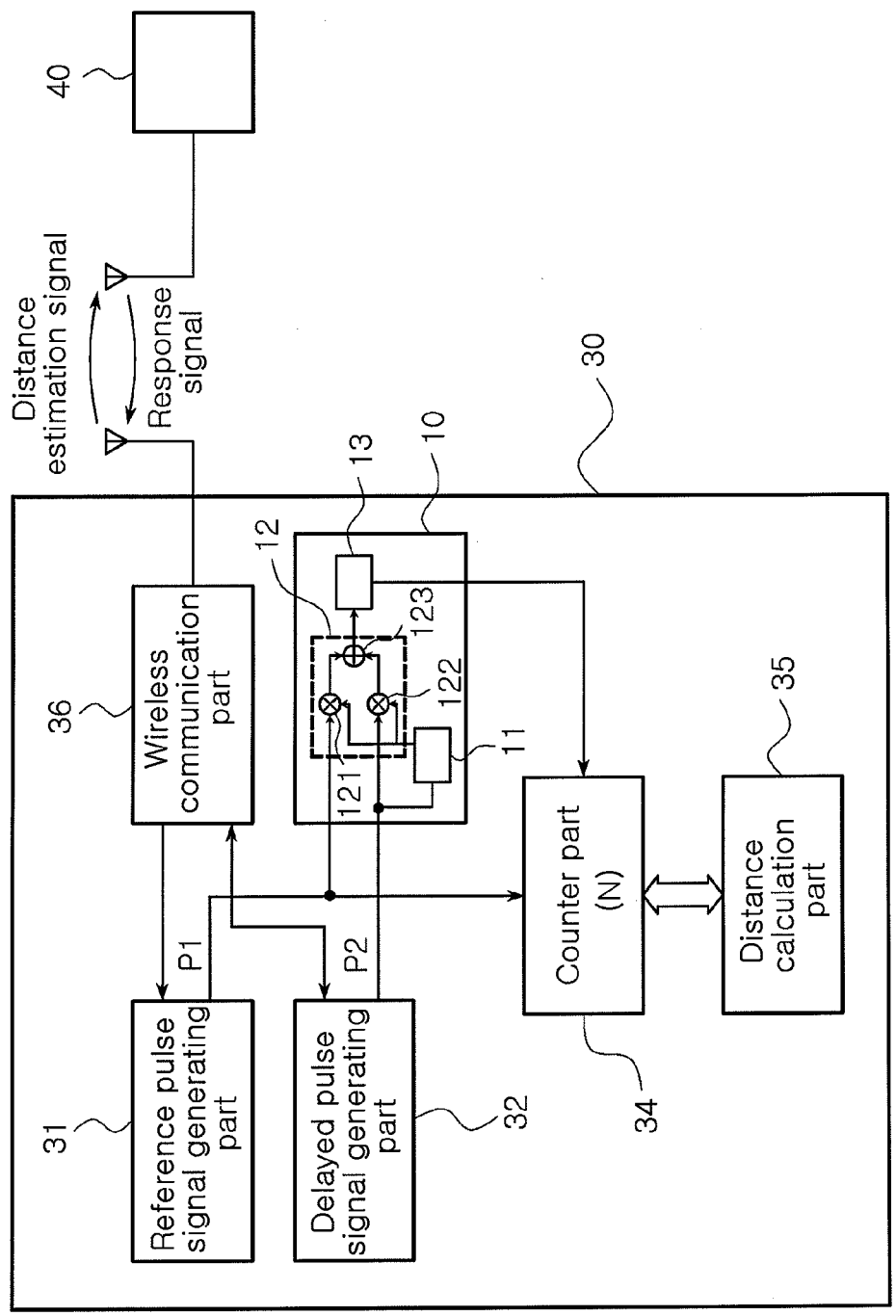
FIG. 4 is a block diagram illustrating an apparatus for estimating a distance using a device for detecting an overlap of pulse signals according to an exemplary embodiment of the invention.

FIG. 4 is a block diagram illustrating an apparatus for estimating a distance using a device for detecting an overlap of pulse signals according to an exemplary embodiment of the invention. To implement the apparatus as shown in FIG. 4, the aforesaid device for detecting an overlap of pulse signals of the present embodiment is employed as an overlap detection part, a constituent element of a distance estimation apparatus disclosed in Korean Patent Application No. 10-2006-0090309, entitled "Apparatus and method for estimating distance using time of arrival".

As shown in FIG. 4, the apparatus of the present embodiment largely includes a reference pulse signal generating part 31, a delayed pulse signal generating part 32, an overlap detection part 10, a counter part 34 and a distance calculation part 35. The apparatus of the present embodiment estimates a distance between two wireless telecommunication devices, i.e., a first wireless communication device 30 and a second wireless communication device 40. The constituent elements may be provided to one of the wireless communication devices 30, e.g., the first wireless communication device 30. The wireless communication devices 30 and 40 each may include a wireless communication part 36 to communicate wirelessly with each other.

The reference pulse signal generating part 31 generates a reference pulse signal P1 having a first frequency f0 at a point where the first wireless communication device 30 transmits a distance estimation signal to the second wireless communication device 40.

The delayed pulse generating part 32 generates a delayed pulse signal P2 having a second frequency f1 different from the first frequency f0 at a point where the first wireless communication device receives a response signal transmitted from the second wireless communication device 40 in response to the distance estimation signal.

The overlap detection part 10 employs the device for detecting an overlap of pulse signals according to the present embodiment described above. The overlap detection part 10 may include a duty adjustor 11, a pulse signal calculator 12 and an overlap determiner 13. The duty adjustor 11 generates a duty adjusted pulse signal P3 by increasing a duty of the delayed pulse signal P2. The pulse signal calculator 12 multiplies the reference pulse signal P1 and the delayed pulse signal P2 by the duty adjusted pulse signal P3, respectively and adds respective results together to output a signal. The overlap determiner determines a middle of a pulse with a greatest width in the signal outputted from the pulse signal calculator 12 as a point where the reference pulse signal P1 and the delayed pulse signal P2 begin to overlap each other.

The counter part 34 counts pulses of one of the reference pulse signal and the delayed pulse signal up to the point of overlapping and outputs a count value N.

The distance calculation part 35 calculates a time from the point of transmitting the distance estimation signal to the point of receiving the response signal based on the first frequency f0, i.e., frequency of the reference pulse signal, the second frequency f1, i.e., frequency of the delayed pulse signal and the count value N of the counter part, and calculates a distance between the first and second wireless communication devices using the calculated time.

Figure 5:
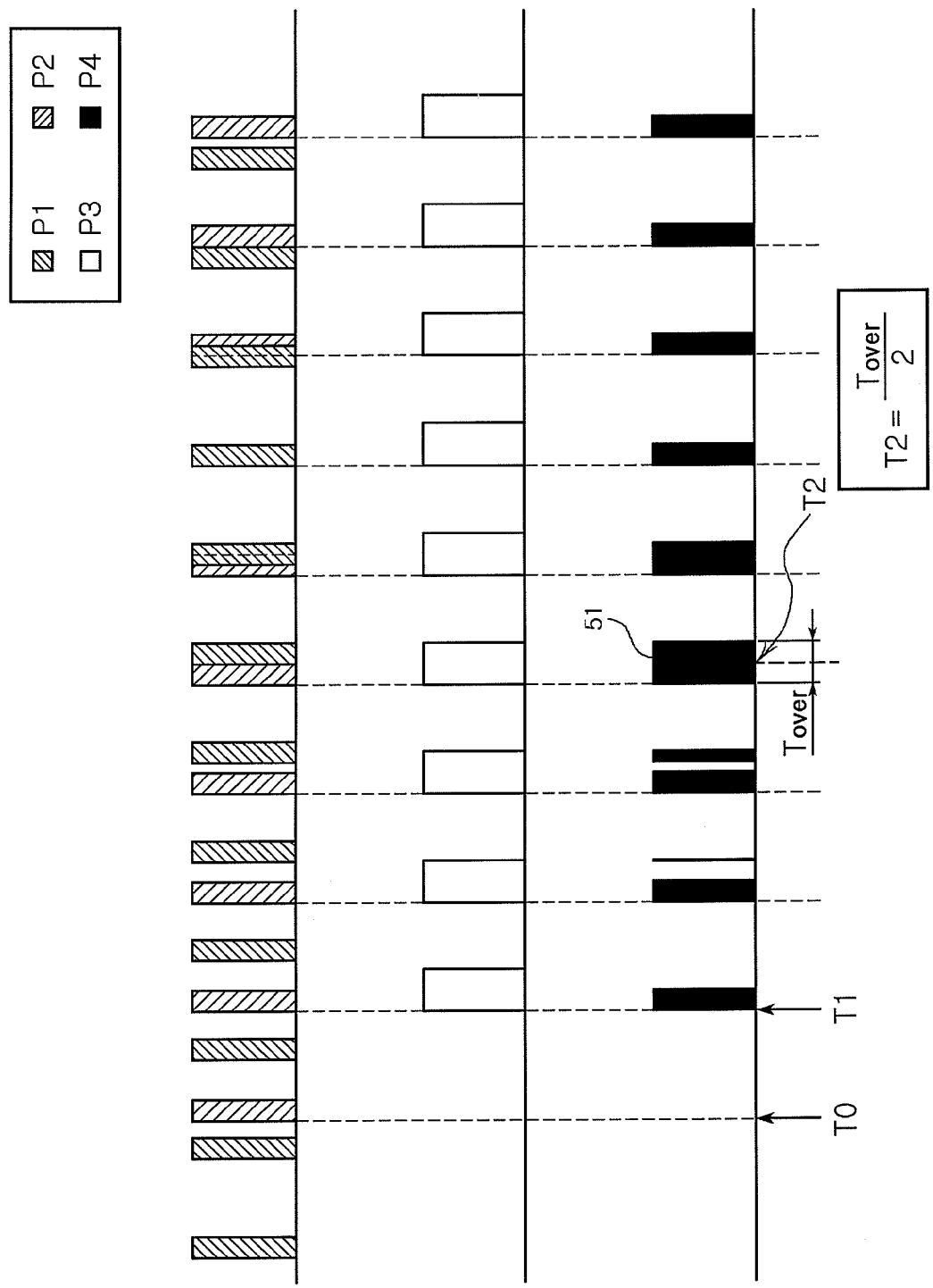
FIG. 5 is a waveform diagram for explaining the operation of a device and method for detecting an overlap of pulse signals and an apparatus for estimating a distance using the same.

FIG. 5 is a waveform diagram for explaining a method for detecting an overlap of pulse signals according to an exemplary embodiment of the invention.

Hereinafter, operations of the present embodiment will be described in detail with reference to FIGS. 2, 4 and 5. The following description of operations of the invention will give a clearer understanding to the method for estimating a distance according to the present embodiment.

The pulse signals on the top in FIG. 5 denote the first pulse signal P1 and the second pulse signal P2. Also, the pulse signal in the middle denotes the third pulse signal P3. The pulse signal on the bottom denotes a signal P4 obtained by multiplying the first and second pulse signals P1 and P2 by the third pulse signal P3, respectively and adding respective results together.

Hereinafter, the first pulse signal may be considered a reference pulse signal in the apparatus of the present embodiment. Thus the two pulse signals are designated with an identical reference numeral of 'P1'. Also, the second pulse signal may be considered a delayed pulse signal in the apparatus of the present embodiment. Thus, the pulse signals are denoted with an identical reference numeral of 'P2'. Also, the third pulse signal is considered identical to the duty adjusted pulse signal with respect to description of the apparatus of the present embodiment.

First, to estimate a distance between the first wireless communication device 30 and the second wireless communication device 40, a wireless communication part 36 of the first wireless communication device transmits a distance estimation signal to the second wireless communication device 40. At the same time, the reference pulse signal generator 31 generates a reference pulse signal P1 having a predetermined first frequency. Also, the counter part 34 begins to count pulses of the reference pulse signal P1. Here, the distance estimation signal is transmitted, the reference pulse signal is generated and the pulse counting is initiated, all at a T0 point.

According to the present embodiment, the counter part 34 counts the pulses of the reference pulse signal P1, but may count pulses of a delayed pulse signal P2 having a second frequency, which will be described later.

Then, the second wireless communication device 40 receives the distance estimation signal and transmits a response signal to the first wireless communication device 30 in response to the distance estimation signal. When this response signal is detected by the first wireless communication device 30, the delayed pulse signal generating part 32 begins to output the delayed pulse signal P2 at a point T1 where the response signal is detected. The delayed pulse signal P2 has a second frequency f1 different from the first frequency f0. Meanwhile, in a case where the delayed pulse signal P2 may be counted in pulses, the counter part 34 will initiate pulse counting of the delayed pulse signal at the same time when the delayed pulse signal P2 is generated.

Thereafter, the overlap detection part 10 detects a portion where the reference pulse signal and the delayed pulse signal overlap each other. The duty adjustor 11 of the overlap detection part 10 outputs the duty adjusted pulse signal P3 by increasing a duty of the delayed pulse signal P2 inputted. The first multiplier 121 of the pulse signal calculator 12 in the overlap detection part 10 multiplies the reference pulse signal P1 by the duty adjusted pulse signal P3. The second multiplier 122 multiplies the delayed pulse signal P2 by the duty adjusted pulse signal P3. Respective results obtained from the multipliers 121 and 122 are added together by the adder 123 to output a signal P4. Through this process, the signal P4 outputted from the pulse signal calculator 12 has pulses generated in portions where the reference pulse signal P1 and the duty adjusted pulse signal P3 overlap each other, and the delayed pulse signal P2 and the duty adjusted pulse signal P3 overlap each other, respectively.

As shown in FIG. 5, the signal P4 outputted from the pulse signal calculator 12 has a pulse of a greatest width when the reference pulse signal P1 and the delayed pulse signal P2 begin to overlap each other. Also, a middle of the pulse of a greatest width is a point where the reference pulse signal P1 and the delayed pulse signal P2 begin to overlap each other. Therefore, the overlap determiner 13 detects the pulse of a greatest width from the signal P4 outputted from the pulse signal calculator 12 and determines a middle Tover/2 of the pulse of a corresponding width Tover as a point T2 where the reference pulse signal P1 and the delayed pulse signal P2 begin to overlap each other.

The duty adjusted pulse signal, i.e., third pulse signal P3 may have a leading edge generated at a point identical to the delayed pulse signal P2 to accurately determine the point of overlapping. Furthermore, a maximum pulse width is obtained at a point where the reference pulse signal P1 and the delayed pulse signal P2 begin to overlap each other, that is, a point where a trailing edge of the reference pulse signal P1 meets a leading edge of the delayed pulse signal P2, or a point where a trailing edge of the delaying pulse signal P2 meets a leading edge of the reference pulse signal P1. Accordingly, a pulse width of the duty adjusted pulse signal, i.e., third pulse signal P3 may be identical to a sum of a pulse width of the reference pulse signal P1 and a pulse width of the delayed pulse signal P2.

According to the present embodiment, the duty adjusted pulse signal P3 is generated based on the delayed pulse signal P2. However, the pulse signal may have a duty increased based on the reference pulse signal P1.

Afterwards, when the overlap detection part 10 detects a point where the reference pulse signal P1 and the delayed pulse signal P2 overlap each other, the counter part 34 stops counting pulses of the reference pulse signal P1, delivers to the distance calculation part 35 a count value N counted from a point T0 of transmitting the distance estimation signal to a point T2 where the reference pulse signal P1 and the delayed pulse signal P2 overlap each other. In turn, the distance calculation part 35 calculates a distance between the first wireless communication device 30 and the second wireless communication device 40 using the count value.

As described above, T0 denotes a point where the first wireless communication device 30 transmits the distance estimation signal, T1 denotes a point where the first wireless communication device 30 receives a response signal from the second wireless communication device 40 in response to the distance estimation signal, and T2 denotes a point where the reference pulse signal P1 and the delayed pulse signal P2 overlap each other. Moreover, Tx denotes a time from a point of transmitting the distance estimation signal to a point of receiving the response signal, N1 denotes a count value of the reference pulse signal P1 up to a point where an overlap is detected, and N2 denotes a count value of the delayed pulse signal P2 up to a point where the overlap is detected. As described above, according to the present embodiment, pulse counting is effected for only one of the reference pulse signal P1 and the reference pulse signal P2. Thus, the count values N1 and N2 are not a value actually counted but defined for an explanatory purpose.

The point T2 where the overlap is detected can satisfy following Equation 2 based on the count value N1 of the reference pulse signal P1 and the count value N2 of the delayed pulse signal P2.

$$T2 = \frac{N1}{f0} = Tx + \frac{N2}{f1} \qquad \text{Equation 2}$$

where f0 is a frequency of a reference pulse signal, i.e., a first frequency, and f1 is a frequency of a delayed pulse signal, i.e., a second frequency.

Equation 2 can be utilized to obtain a time Tx from a point of transmitting the distance estimation signal to a point of receiving the response signal according to Equation 3 below. Since Tx denotes the time when a signal reciprocates between the two wireless communication devices, with the time Tx determined, a distance between the two wireless communication devices can be calculated.

$$Tx = \frac{N1}{f0} - \frac{N2}{f1} \qquad \text{Equation 3}$$

Meanwhile, when distance estimation is performed within a distance in which a Tx value has a sufficiently smaller value than a frequency 1/f0 of the reference pulse signal P1 and a frequency 1/f1 of the delayed pulse signal P2, e.g., in an indoor environment within a 30 m radius, the count value N1 of the reference pulse signal P1 is substantially identical to the count value N2 of the delayed pulse signal P2. Therefore, Equation 3 may approximate Equation 1 below.

$$Tx = N \cdot \left| \frac{1}{f0} - \frac{1}{f1} \right| + \delta \qquad \text{Equation 1}$$

where N is a count value of one of a reference pulse signal and a delayed pulse signal.

An offset value δ set arbitrarily in Equation 1 includes all potential error components according to the present embodiment. For example, the offset value δ may include an error component generated when the count value N1 of the reference pulse signal P1 is approximated to be substantially identical to the count value N2 of the delayed pulse signal P2. Also, the offset value δ may include an error component resulting from a signal-processing time required for the second wireless communication device when the second wireless communication device receives the distance estimation signal transmitted from the first wireless communication device and transmits a response signal in response to the distance estimation signal.

As described above, according to the present embodiment, to detect an overlap between two pulse signals having different frequencies, the two pulse signals are not directly multiplied by each other to detect a portion of overlapping. In place thereof, a new pulse signal having an identical frequency to one of the two pulse signals and a duty increased is generated to detect a point where the new pulse signal and the two pulse signals overlap to the maximum. Accordingly, this allows accurate detection of a point where the two pulse signals overlap each other even though the purse signals are overlapped in a very small portion.

As set forth above, according to exemplary embodiments of the invention, to detect an overlapping portion of first and second pulse signals, a new third pulse signal having a frequency identical to one of the two pulse signals and a duty increased is generated. Then, out of portions where the third pulse signal and the first and second pulse signals overlap each other, respectively, a largest portion is selected to detect a point where the first and second pulse signals overlap each other. This accordingly allows accurate detection of the point where the pulse signals overlap each other, even though the pulse signals are overlapped in a very small portion.

In addition, since the point of overlap between the two pulse signals can be detected accurately, a distance between the mobile communication devices can be estimated with higher accuracy by counting pulses of the pulse signals and detecting the point where the pulse signals overlap each other.

While the present invention has been shown and described in connection with the exemplary embodiments, it will be apparent to those skilled in the art that modifications and variations can be made without departing from the spirit and scope of the invention as defined by the appended claims.

What is claimed is:

1. A device for detecting an overlap of pulse signals, the device detecting a point where first and second pulse signals having different frequencies begin to overlap each other, the device comprising:
   a duty adjustor generating a third pulse signal by increasing a duty of the second pulse signal;
   a pulse signal calculator multiplying the first and second pulse signals by the third pulse signal, respectively and adding respective results together to output a signal; and
   an overlap determiner determining a middle of a pulse with a greatest width in the signal outputted from the pulse signal calculator as a point where the first and second pulse signals overlap each other.

2. The device of claim 1, wherein the third pulse signal has a leading edge at a point identical to the second pulse signal.

3. The device of claim 1, wherein the third pulse signal has a pulse width identical to a sum of a pulse width of the first pulse signal and a pulse width of the second pulse signal.

4. The device of claim 1, wherein the pulse signal calculator comprises:
   a first multiplier multiplying the first pulse signal by the third pulse signal;
   a second multiplier multiplying the second pulse signal by the third pulse signal; and
   an adder adding and outputting outputs of the first and second multipliers.

5. A method for detecting an overlap of pulse signals, the method designed to detect a point where first and second pulse signals begin to overlap each other, the method comprising:
   generating a third pulse signal by increasing a duty of the second pulse signal;
   multiplying the first and second pulse signals by the third pulse signal, respectively and adding respective results together to output a signal; and
   determining a middle of a pulse with a greatest width in the signal outputted as a point where the first and second pulse signals begin to overlap each other.

6. The method of claim 5, wherein the third pulse signal has a leading edge at a point identical to the second pulse signal.

7. The method of claim 5, wherein the third pulse signal has a pulse width identical to a sum of a pulse width of the first pulse signal and a pulse width of the second pulse signal.

8. An apparatus for estimating a distance, the apparatus estimating a distance between first and second wireless communication devices which communicate wirelessly with each other, the apparatus comprising:
   a reference pulse signal generating part generating a reference pulse signal having a first frequency at a point where the first wireless communication device transmits a distance estimation signal to the second wireless communication device;
   a delayed pulse signal generating part generating a delayed pulse signal having a second frequency different from the first frequency at a point where the first wireless communication device receives a response signal transmitted from the second wireless communication device in response to the distance estimation signal;
   an overlap detection part comprising:
      a duty adjustor generating a duty adjusted pulse signal by increasing a duty of the delayed pulse signal;
      a pulse signal calculator multiplying the reference pulse signal and the delayed pulse signal by the duty adjusted pulse signal, respectively, and adding respective results together to output a signal; and
      an overlap determiner determining a middle point of a pulse with a greatest width in the signal outputted from the pulse signal calculator as a point where the reference pulse signal and the delayed pulse signal begin to overlap each other;
   a counter part counting a pulse of one of the reference pulse signal and the delayed pulse signal up to the point where the reference pulse signal and the delayed pulse signal begin to overlap each other; and
   a distance calculation part calculating a time from a point of transmitting the distance estimation signal to a point of receiving the response signal based on the first frequency, the second frequency and a count value of the counter part, and calculating a distance between the first and second wireless communication devices based on the time.

9. The apparatus of claim 8, wherein the distance calculation part calculates the time from the point of transmitting the distance estimation signal to the point of receiving the response signal according to Equation 1:

$$Tx = N \cdot \left| \frac{1}{f0} - \frac{1}{f1} \right| + \delta \qquad \text{Equation 1}$$

where Tx is the time from the point of transmitting the distance estimation signal to the point of receiving the response signal, N is the count value of one of the reference pulse signal and the delayed pulse signal, f0 is the frequency of the reference pulse signal, f1 is the frequency of the delayed pulse signal and $\delta$ is an arbitrary offset value.

10. The apparatus of claim 8, wherein the duty adjusted pulse signal has a leading edge at a point identical to the delayed pulse signal.

11. The apparatus of claim 8, wherein the duty adjusted pulse signal has a pulse width identical to a sum of a pulse width of the reference pulse signal and a pulse width of the delayed pulse signal.

* * * * *